Nov. 16, 1965  T. J. HOLCE  3,218,508
HIGH VOLTAGE POWER SUPPLY
Filed April 10, 1962  2 Sheets-Sheet 1

Thomas J. Holce
INVENTOR.
BY Oliver D. Olson
Agent

Thomas J. Holce
INVENTOR.
BY Oliver D. Olson
Agent

United States Patent Office 3,218,508
Patented Nov. 16, 1965

3,218,508
HIGH VOLTAGE POWER SUPPLY
Thomas J. Holce, Forest Grove, Oreg., assignor, by mesne assignments, to Varian Associates, Palo Alto, Calif., a corporation of California
Filed Apr. 10, 1962, Ser. No. 186,516
2 Claims. (Cl. 315—97)

This invention relates to electric power supplies, and more particularly to the novel construction of a high voltage power supply by which the following objectives are attained:

The high voltage power supply construction of the present invention provides for the optimum location of the high voltage components, substantially eliminating stray radio frequency transmissions and corona, provides a compact, light-weight unit affording maximum versatility of use, and is characterized by maximum reliability and precision of performance.

The foregoing and other objects and advantages of this invention will appear from the following detailed description, taken in connection with the accompanying drawings in which.

Figure 1:
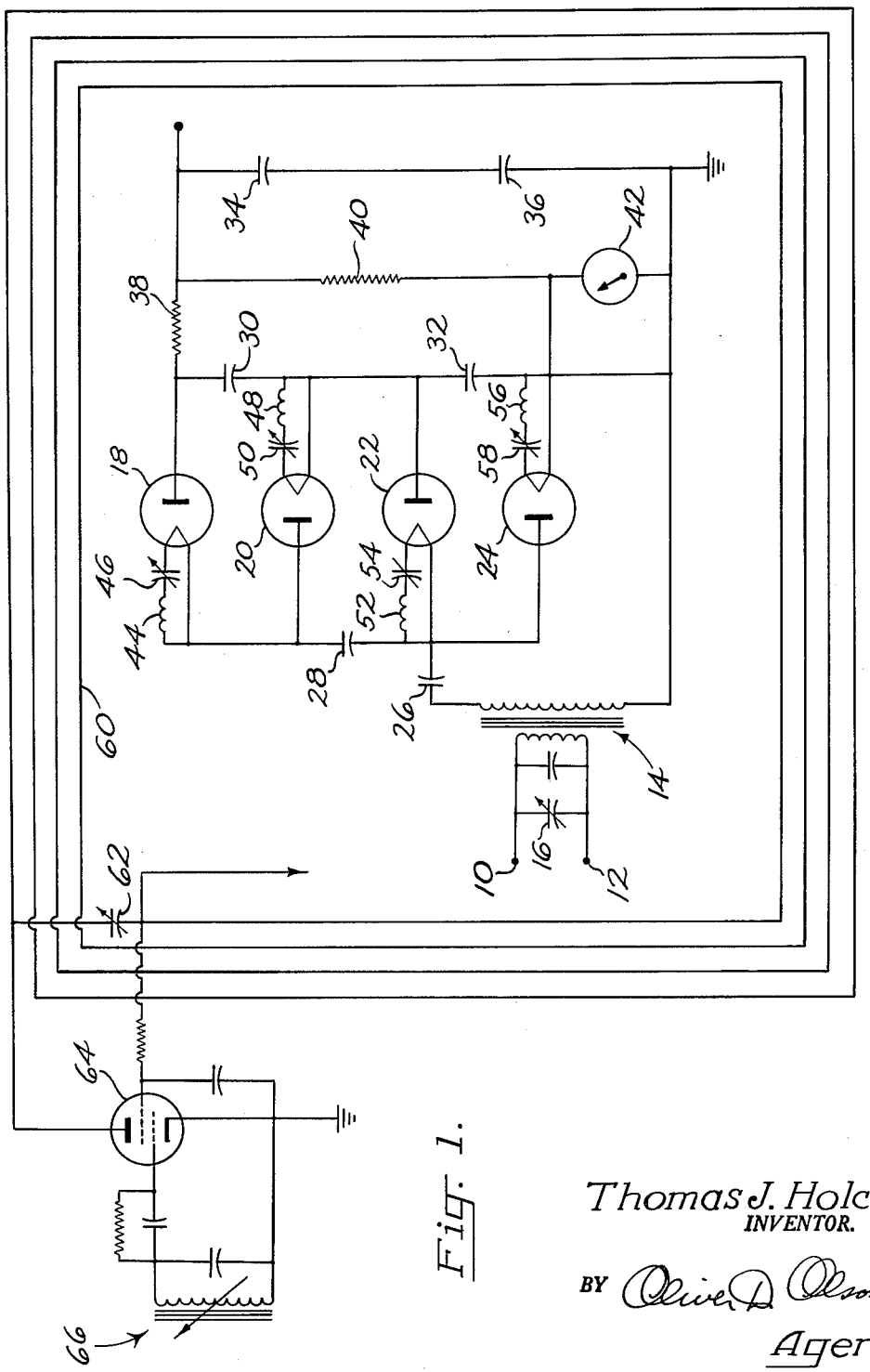
FIG. 1 is a schematic electrical diagram illustrating a high voltage power supply embodying the features of the present invention.

Referring first to FIG. 1 of the drawings, the high voltage power supply illustrated therein is of the radio frequency type, providing continuously variable direct current output voltages over a range, for example, from 10 to 40 kilovolts, from a high voltage quadrupler stage. A regulated radio frequency signal is supplied by well-known means to the terminals 10, 12 of the primary winding of the high voltage transformer 14. The variable capacitor 16 across this winding serves to adjust the frequency of the signal to resonate with the high voltage transformer.

The secondary winding of the high voltage transformer is connected to the high voltage rectifier assembly which includes the four diode rectifier tubes 18, 20, 22 and 24 arranged in series, as indicated, and the capacitors 26, 28, 30 and 32. The rectified output is filtered by the RC filter network comprising capacitors 30, 32, 34 and 36, and resistor 38. Resistor 40 supplies proper current to the indicator meter 42.

The foregoing assembly is well-known, and thus forms no part of the present invention. However, a particularly important feature of this invention involves the novel arrangement by which electric energy is supplied to the filaments of the diode rectifiers. Each filament is connected to a resonant circuit which, in the embodiment illustrated, is a series tuned LC circuit including a coil and a variable capacitor. Thus, the filament circuit of tube 18 includes coil 44 and capacitor 46, the filament circuit for tube 20 includes coil 48 and capacitor 50, the filament circuit for tube 22 includes coil 52 and capacitor 54, and the filament circuit of tube 24 includes coil 56 and capacitor 58. High frequency energy is supplied to these tuned circuits from an oscillator tank circuit which comprises the coil 60 and variable capacitor 62. This tank circuit is connected to the plate of the oscillator tube 64 which is connected as a conventional Hartley oscillator. The frequency of oscillation is adjusted by means of the variable choke coil 66, and the tank circuit capacitor 62 is adjustable for resonance therewith.

As indicated in FIG. 1, the coil 60 of the tank circuit is arranged so that its radiating field completely envelopes the entire assembly of the resonant circuits of the high voltage rectifier stage. Thus, high frequency electric energy is "broadcasted" from the tank coil to the filaments of all of the rectifier tubes. Proper filament energy is controlled by adjusting the variable capacitor in the associated series tuned circuit.

Since the energy for the filaments is derived from a source separate from the radio frequency drive signal supplied to the primary of transformer 14, and thus is independent of the latter, uniform filament energy is maintained regardless of variations in the magnitude of the drive signal.

Figure 2:
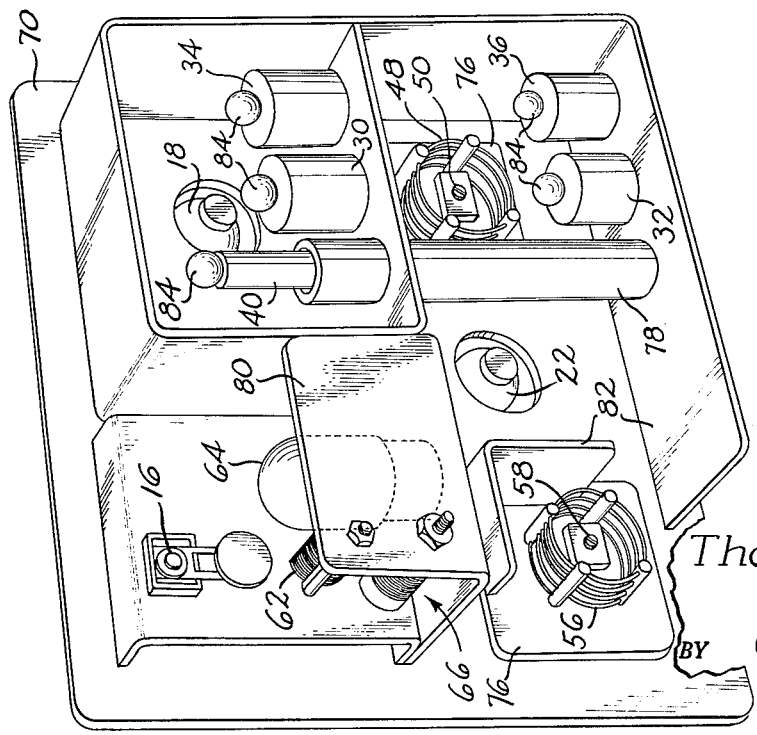
FIG. 2 is a fragmentary perspective view showing the component arrangement on one side of a mounting chassis.

Since the tank coil surrounds all of the rectifier tubes, optimum placement of the latter relative to each other is afforded, thereby reducing the size of the unit to a minimum. This is illustrated in FIGS. 2 and 3, wherein the electrically non-conductive chassis plate 70 supports the components in an orderly and compact arrangement.

Figure 3:
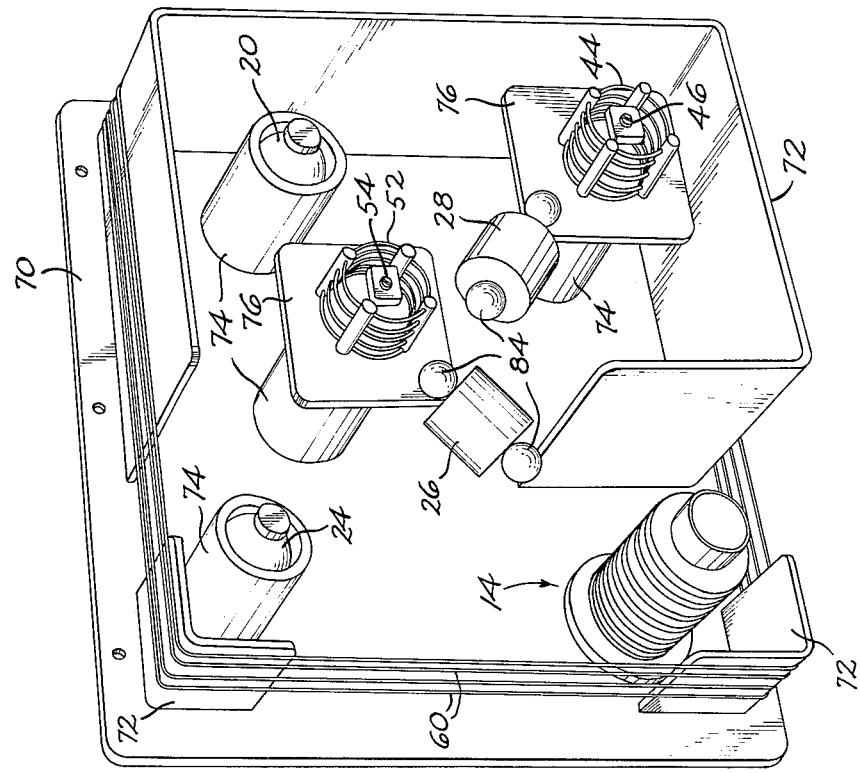
FIG. 3 is a perspective view showing the component arrangement on the opposite side of the mounting chassis.

Referring particularly to FIG. 3, the tank coil 60 comprises four turns of wire supported by electrically non-conductive shielding brackets 72 mounted upon the electrically non-conductive chassis plate 70 and projecting from one side of the latter adjacent the sides thereof. Minimum spacing between the tubes is afforded by this arrangement, and minimum length of connections between the tubes and associated components is effected by extending the tubes through the chassis plate alternately in opposite directions.

Each tube is confined freely within an electrically non-conductive casing 74 supported by the chassis plate, and the end of the casing adjacent the filament terminals of the tube is provided with a mounting plate 76 on which to support the components of the associated series tuned circuit. The meter resistor 40 also is enclosed in a non-conductive casing 78.

On the opposite side of the chassis plate 70, the oscillator circuit is supported upon an L-shaped bracket 80 mounted upon the chassis plate. The bracket is made of electrically non-conductive material which serves additionally to shield the oscillator circuit from the other stages of the power supply circuit. Additional non-conductive brackets 82 provide similar shielding between stages of the circuit.

The spherical connectors 84 on the capacitors and meter resistor, as well as the non-conductive shielding brackets, serve to distribute the fields. Moreover, common fields are concentrated by proper arrangement of the components on the main base. These factors contribute materially to the elimination of corona discharge.

The entire assembly of components and chassis plate is housed within a shielded metallic cage (not shown) which affords ample ventilation and reduces radio frequency transmission well below the minimum tolerance. The dimensions of the cage for the assembly illustrated may be less than one foot cube.

From the foregoing it will be apparent that the important advantages of the compact design, elimination of corona discharge and radio frequency transmission, and effective operation and long life with minimum maintenance and repair are achieved primarily by the enclosure of the rectifier tubes within the perimeter of the tank coil 60 by which the filaments of all of the rectifier tubes are supplied with energy.

It will be apparent to those skilled in the art that various changes may be made in the details of construction described hereinbefore, without departing from the spirit of this invention and the scope of the appended claims.

Having now described my invention and the manner in which it may be used, what I claim as new and desire to secure by Letters Patent is:

1. In an electronic circuit including a plurality of electron discharge devices each operable by a heated filament, means providing electric energy to said heated filaments, comprising a resonant circuit connected to each filament, a source of electric filament energy comprising a high frequency oscillator including a tank coil, and means supporting the tank coil in a position surrounding all of said resonant circuits, the resonant circuits being tuned relative to the oscillator frequency to provide proper electric energy to the associated filaments.

2. In a high voltage power supply of the radio frequency type having a source of high frequency drive signal connected to a rectifier stage including a plurality of rectifier tubes each operable by a heated filament, means providing electric energy to said heated filaments, comprising a resonant circuit connected to each filament, a source of electric filament energy comprising a high frequency oscillator independent of the high frequency drive signal source and including a tank coil, and means supporting the tank coil in a position surrounding all of said resonant circuits, the resonant circuits being tuned relative to the oscillator frequency to provide proper electric energy to the associated filaments.

References Cited by the Examiner
UNITED STATES PATENTS

| | | | |
|---|---|---|---|
| 2,568,484 | 9/1951 | Cage | 321—32 X |
| 2,820,940 | 1/1958 | Boley | 321—15 |
| 2,880,385 | 3/1959 | Callender | 331—74 X |

FOREIGN PATENTS

| | | |
|---|---|---|
| 414,560 | 5/1934 | Great Britain. |

GEORGE N. WESTBY, *Primary Examiner.*
BENNETT G. MILLER, *Examiner.*